United States Patent [19]

Wang

[11] Patent Number: 4,968,520
[45] Date of Patent: Nov. 6, 1990

[54] FREEZING OF FOOD PRODUCTS
[75] Inventor: Pie Y. Wang, Wheaton, Ill.
[73] Assignee: Swift-Eckrich, Inc., Downers Grove, Ill.
[21] Appl. No.: 174,208
[22] Filed: Mar. 28, 1988
[51] Int. Cl.$^5$ .............................................. A23B 4/09
[52] U.S. Cl. ...................................... 426/524; 426/327
[58] Field of Search ................... 426/524, 327, 641; 62/64

[56] References Cited

U.S. PATENT DOCUMENTS

| 1,969,832 | 4/1929 | Beard | 426/524 |
| 3,027,734 | 4/1962 | Mills | 426/524 |
| 4,601,909 | 7/1986 | Nagoshi | 426/524 |
| 4,654,217 | 3/1987 | Nagoshi | 426/524 |
| 4,657,768 | 4/1987 | Nagoshi | 428/524 |

FOREIGN PATENT DOCUMENTS

| 48009 | 9/1980 | Japan | 426/524 |
| 48111 | 11/1981 | Japan | 426/327 |
| 0144043 | 11/1981 | Japan | 426/327 |
| 0144046 | 11/1981 | Japan | 428/327 |
| 48601 | 1/1986 | Japan | 426/327 |
| 48606 | 6/1986 | Japan | 426/327 |
| 1124310 | 6/1986 | Japan | 426/327 |
| 48412 | 12/1987 | Japan | 426/327 |

OTHER PUBLICATIONS

Cipolletti et al., "Freezing . . . Chloride", J. Food Science, vol. 42, pp. 911–916, 1977.

Primary Examiner—Peter Kratz
Attorney, Agent, or Firm—Edward T. McCabe

[57] ABSTRACT

A method of freezing food products such as meat and poultry as well as vegetables and fruits, including the steps of cooling brine made up of propylene glycol, sodium chloride and water and then contacting the food product with the cooled brine. The food product is maintained in contact with the brine for a time sufficient to freeze the food to a desired temperature.

8 Claims, 2 Drawing Sheets

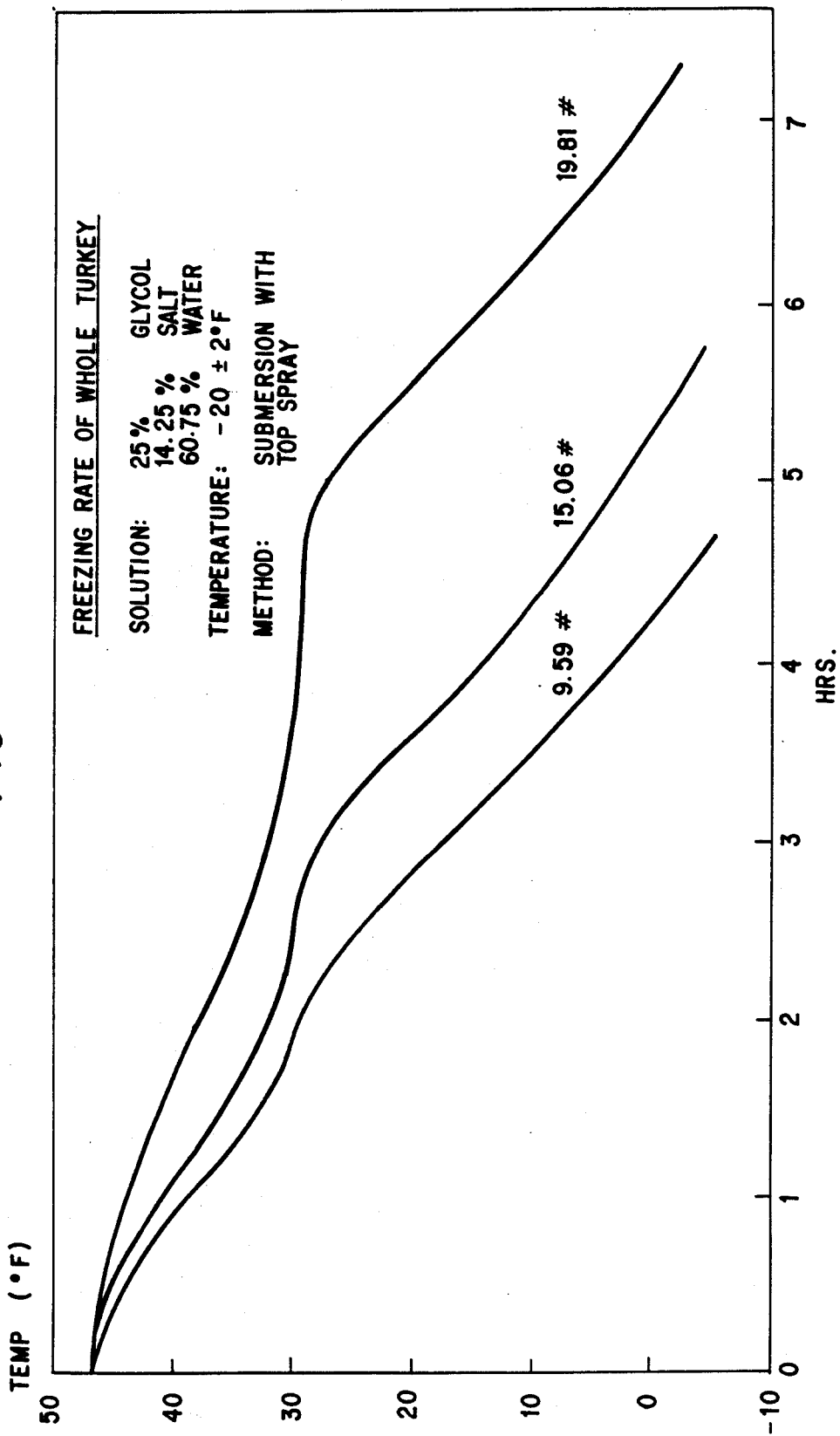

FREEZING OF FOOD PRODUCTS

BACKGROUND OF THE INVENTION

This invention relates to the chilling of food products in general, including meat, poultry, fish, fruits and vegetables and to the rapid and efficient freezing of such foodstuffs. Meat and poultry are frozen by air blast or liquid gas freezing methods utilizing liquid nitrogen or carbon dioxide. Aqueous media have also been proposed as freezants in an attempt to achieve a high rate of freezing along with minimal expense. Cryogenic freezing provides a rapid rate of cooling but the cost is substantial. Air blast chilling on the other hand is fairly economical but the cost mounts quickly since it requires long periods of time to attain desired low temperatures. Liquids such as aqueous solutions containing calcium chloride, ethylene glycol and propylene glycol as freezing point depressants have also been proposed. These, however, have not been favorably received since they present problems with handling of such solutions (high viscosity) or they contaminate the food with objectionable medicinal or other flavors and aftertastes.

Accordingly, it is an object of this invention to provide a freezant and a method for using said freezant in the rapid, economical, chilling of foodstuffs to low temperatures without adversely affecting said foodstuffs organoleptically or otherwise.

Another object of the invention is to provide a method for freezing poultry and meat with a solution having a freezing point below −5° F., yet having a viscosity sufficiently low to allow for easy pumping of said solution and ease of handling and contacting of such meat and poultry with the solution.

In U.S. Pat. No. 4,601,909, which issued Jul. 22, 1986 to Kazunori Nagoshi, a method of freezing fishery products is described. The process involves cooling a brine of 10% calcium chloride, water, 40% propylene glycol and rapeseed oil to between −30° C. (−22° F.) and −42° C. (−43.6° F.) and immersing the fish in the brine until frozen. Not mentioned is the high viscosity of the solution resulting from the large quantity of propylene glycol and the bitterness of the resulting product imparted by calcium chloride. Accordingly, it is an object of this invention to provide a low viscosity freezant free of pumping limitations and also without the objectionable flavor characteristics of Nagoshi.

In the article "Freezing of Vegetables By Direct Contact With Aqueous Solutions of Ethanol And Sodium Chloride" in Journal of Food Science Vol. 42, No. 4(1977), pages 911–916, J. C. Cipolletti, et al., describe the use of aqueous freezants in lowering the temperature of carrots, corn, peas, and beans by direct contact freezing. The freezant is made up of 15% sodium chloride, 15% ethanol and the remainder water. The maximum depression of freezing point is around −20° F. A shortcoming of the Cipolletti, et al. process is the medicinal taste imparted to the product by ethanol. Accordingly, it is another object of this invention to provide a more efficient freezant capable of more rapidly depressing the temperature of the foodstuff with which it is contacted, yet which has low viscosity, flavor suitability, and favorable cost characteristics.

Additional objects of the invention, if not specifically set forth herein, will be readily apparent to those skilled in the art from a reading of the following detailed description of the invention.

SUMMARY OF THE INVENTION

Generally the present invention is directed to the rapid and efficient freezing of foodstuffs by a process that insures rapid lowering of temperature of the foodstuff from ambient temperature to −5° F. and less without having any deleterious affect on the foodstuff either organoleptically or otherwise. The flavor, texture and quality of the thawed product is excellent, undiminished from the fresh unfrozen product and the process is economical and operationally feasible. It provides a substantial improvement in one or more ways over air blast freezing, liquid gas freezing or aqueous brine freezing utilizing inorganic salts, acids or bases. Furthermore, the method of this invention overcomes flavor and viscosity limitations presented by liquid freezants of the prior art.

DESCRIPTION OF THE DRAWING

FIG. 2 is a graph showing the rapid freezing rate of turkeys processed in accordance with the method of the invention.

DETAILED DESCRIPTION

Figure 1:
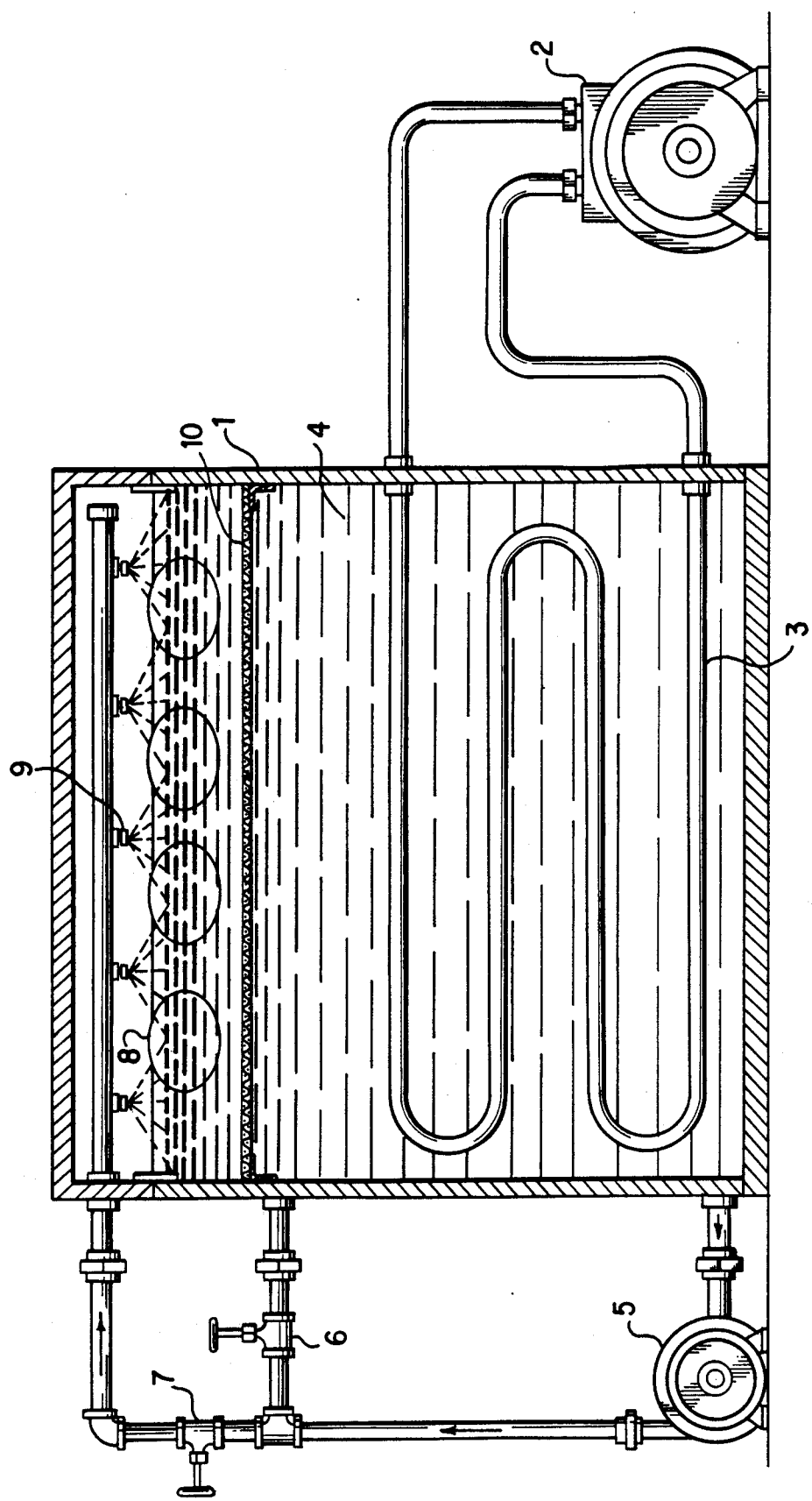
FIG. 1 comprises a schematic illustration of one freezing device that can be used in the practice of the invention.

Cooling of the freezant may be effected in a device such as that of the Drawing. The liquid freezant is introduced into a brine holding tank 1 equipped with a compressor 2 and expansion coil 3 comprising a mechanical freezing device. The expansion coil is immersed in the liquid freezant 4 in the tank and a pump 5 is used to circulate the freezant through valves 6 and 7 over the foodstuff 8 through spray nozzles 9. A screen 10 located in the tank to filter particulate materials is designed to provide for protection of the pumps and valves from extraneous materials. In operation, the freezant is cooled to a range of −5° F. to −35° F. utilizing varying proportions of propylene glycol, sodium chloride and water. As propylene glycol concentration exceeds about 35% by weight, the freezant becomes too thick for pumping in a practical commercial operation even though the freezing point of such high glycol freezants is desirably low. Table 1, which follows, illustrate freezing point depressions by varying proportions of propylene glycol and sodium chloride in the aqueous freezing solution.

TABLE 1

Freezing Point of Glycol-Salt-Water Solution

| % of Glycol | % of *Brine | % by Weight | | | Freezing Point °F. |
|---|---|---|---|---|---|
| | | Glycol | Salt | Water | |
| 0 | 100 | 0 | 20 | 80 | 2** |
| 5 | 95 | 5 | 19 | 76 | −5 |
| 10 | 90 | 10 | 18 | 72 | −10 |
| 15 | 85 | 15 | 17 | 68 | −15 |
| 20 | 80 | 20 | 16 | 64 | −20 |
| 25 | 75 | 25 | 15 | 60 | −26 |
| 30 | 70 | 30 | 14 | 56 | −32 |
| 35 | 65 | 35 | 13 | 52 | −44 |

*20% sodium chloride and 80% water by weight.
**Data from Ashrae Handbook, 1980.

At the higher glycol percentages, although the freezing point depression is greatest and the rate of freezing is highest, the viscosity of the solution is close to the limit insofar as pumping is concerned. Pumpability of the freezant becomes difficult at about 160 centipoises and cannot easily be used above that level. The amount of propylene glycol in said freezant on a weight basis is about 5-35%, the amount of sodium chloride about 5-20% and the amount of water is about 90-45%. The amount of propylene glycol in said freezant on a weight basis should be insufficient to raise the viscosity of the freezant above about 160 centipoises. Table 2 illustrates the viscosities of aqueous freezant solutions at −20° F.

TABLE 2

Viscosity of Aqueous Solutions

| Solution | *Viscosity at −20° F. |
|---|---|
| Calcium Chloride (26% Wt.) | 12.5 centipoise |
| Glycol-Salt-Water (25, 15, 60% Wt.) | 53.0 centipoise |
| Glycol-CaCl₂-Water (40, 10, 50% Wt.) | 189.0 centipoise |
| Glycol-Water (50, 50% Wt.) | 168.0 centipoise |

*Viscosity was measured at −20° F. on a Brookfield Viscometer (LVT Model)

In the prior art freezing of whole bird turkeys, the carcasses are subjected to air blast freezing or salt brine prechilling followed by air blast freezing. This system is slow, uneconomical and requires a great deal of space. The method of this invention is carried out using the freezant as a spray or by immersion of deluge shower system or a combination of these techniques. Regulations of the U.S. Department of Agriculture provide that frozen turkeys must be frozen to −0° F. or lower. The lower the freezant temperature, the higher the heat transfer rate is and thus the shorter the freezing time.

EXAMPLE

Cleaned, eviscerated, washed and pre-chilled (with cold water) turkeys were wrapped in plastic bags and stored in a cooler at 45° F. for about 12 hours for temperature equilibration. Three sizes of turkeys were used: small grown (average 9.6 lb.), hens (average 15 lb.), and toms (average 19 lb.). Thermocouples were inserted into each bird in the breast adjacent the rib cage for temperature measurement. The turkeys were then loaded in the tank as shown in the Figure and frozen to 0° F. Internal temperature over a period of 4 hours 16 minutes for small grown, 5 hours 20 minutes for hens and 7 hours 10 minutes for toms. The course of the temperature depression for each bird was continuously monitored and is shown in the graph of FIG. 2. The rapid freezing rate shown by the graph can be compared to freezing time of the same sized turkeys by air blast freezing, which requires 24 to 48 hours to chill the turkeys to 0° F.

The brine which comprises 25% propylene glycol, 15% salt and 60% water by weight was held at −20° F. during freezing. Other tests using different proportions of the three components, propylene glycol, sodium chloride and water performed similarly. The solubility of sodium chloride at −20° F. is such that one part of salt is best used with four parts water. An attempt to produce a propylene glycol-water solution having a similarly low freezing point required a 50—50 water-propylene glycol mixture. As can be appreciated from the data of Table 2, such a solution is so viscous as to be impractical in commercial use. Further, this solution is about twice as expensive as the three component freezant disclosed and claimed herein.

The freezant solution of this invention can be utilized either in bath or continuous freezing processes characterized by a faster freezing rate, with consequent less drip in the turkey on thawing, with little or no cell breakdown in the turkey meat and no introduction of objectionable flavors during the processing.

Chillers such as the rotating drum type, Roser liquid chillers or simple drag through tank types can also be used in the method of this invention.

Obviously many modifications and variations of the invention as hereinbefore set forth may be made without departing form the spirit and scope thereof and therefore only those limitations should be imposed as are indicated in the appended claims.

I claim:

1. A method for freezing meat comprising contacting such meat with a freezant comprising about 5-35% propylene glycol, 5-20% sodium chloride and 90-45% water on a weight basis cooling said freezant to a temperature of −5° F. or lower and maintaining said meat in contact with said freezant for a time sufficient to reduce the temperature of said meat as desired to about 0° F. or less.

2. The method of claim 1 wherein the ratio between sodium chloride and water is 1 to 4.

3. The method of claim 1 wherein the amount of propylene glycol in said freezant on a weight basis is insufficient to raise the viscosity of said freezant above about 160 centipoises.

4. The method of claim 1 wherein the meat is poultry.

5. The method of claim 1 wherein said freezant is cooled to a temperature of about −5° F. to about −44° F.

6. The method of claim 1 wherein said meat is contacted with said freezant by immersion.

7. The method of claim 1 wherein said meat is sprayed or showered with said freezant.

8. The method of claim 1 wherein said meat is conveyed with said freezant and sprayed with said freezant from the top.

* * * * *